US012808439B2

(12) United States Patent
Sugiyama et al.

(10) Patent No.: US 12,808,439 B2
(45) Date of Patent: Nov. 24, 2026

(54) SEALING DEVICE

(71) Applicant: NOK CORPORATION, Tokyo (JP)

(72) Inventors: Junya Sugiyama, Fukushima (JP); Hideaki Nagahamaya, Fukushima (JP); Yuki Sato, Fukushima (JP); Kenichi Yoshimura, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 19/130,608

(22) PCT Filed: Nov. 14, 2023

(86) PCT No.: PCT/JP2023/040882
§ 371 (c)(1),
(2) Date: May 16, 2025

(87) PCT Pub. No.: WO2024/106416
PCT Pub. Date: May 23, 2024

(65) Prior Publication Data

US 2026/0085754 A1 Mar. 26, 2026

(30) Foreign Application Priority Data

Nov. 17, 2022 (JP) ................................ 2022-184137

(51) Int. Cl.
*F16J 15/3284* (2016.01)
*F16J 15/3204* (2016.01)
(Continued)

(52) U.S. Cl.
CPC ....... *F16J 15/3284* (2013.01); *F16J 15/3204* (2013.01); *F16J 15/324* (2013.01); *F16J 15/3244* (2013.01); *F16J 15/3232* (2013.01)

(58) Field of Classification Search
CPC .... F16J 15/3204; F16J 15/3232; F16J 15/324; F16J 15/3244; F16J 15/3284
See application file for complete search history.

(56) References Cited

U.S. PATENT DOCUMENTS 6,676,132 B1 * 1/2004 Takebayashi ........ F16J 15/3284 277/560
8,413,995 B2 * 4/2013 Matsui ................ F16J 15/3244 277/559
(Continued)

FOREIGN PATENT DOCUMENTS

EP 3199584 A1 8/2017
EP 4006114 A1 6/2022
(Continued)

OTHER PUBLICATIONS

ISR for PCT/JP2023/040882, dated Jan. 23, 2024 (w/ translation).
(Continued)

*Primary Examiner* — Nicholas L Foster
(74) *Attorney, Agent, or Firm* — GREENBLUM & BERNSTEIN, P.L.C.

(57) ABSTRACT

A sealing device according to an aspect of this disclosure includes an annular metal ring, and an annular seal lip provided on the metal ring. A rotary shaft rotatable clockwise and counterclockwise is inserted into the seal lip. The seal lip is configured to come into contact with the rotary shaft and to withstand sliding against the rotary shaft when the rotary shaft rotates at a circumferential speed of 50 m per second.

7 Claims, 6 Drawing Sheets

(51) Int. Cl.

| | |
|---|---|
| ***F16J 15/3232*** | (2016.01) |
| ***F16J 15/324*** | (2016.01) |
| ***F16J 15/3244*** | (2016.01) |

(56) References Cited

U.S. PATENT DOCUMENTS

| | | | | |
|---|---|---|---|---|
| 9,523,059 | B2 * | 12/2016 | Kunishima | C08J 7/043 |
| 11,828,366 | B2 * | 11/2023 | Kikuchi | F16J 15/3284 |
| 12,264,259 | B2 * | 4/2025 | Yasunaga | F16J 15/324 |
| 2009/0200750 | A1 | 8/2009 | Takeno et al. | |
| 2010/0109252 | A1 * | 5/2010 | Matsui | F16J 15/324<br>277/559 |
| 2011/0095486 | A1 | 4/2011 | Nakagawa | |
| 2016/0068779 | A1 * | 3/2016 | Kunishima | F16J 15/324<br>508/106 |
| 2017/0283642 | A1 | 10/2017 | Kimura et al. | |
| 2021/0010599 | A1 | 1/2021 | Yonai et al. | |
| 2022/0178448 | A1 | 6/2022 | Kikuchi | |
| 2022/0251419 | A1 * | 8/2022 | Yasunaga | C09D 7/65 |
| 2024/0026977 | A1 | 1/2024 | Yamaguchi et al. | |

FOREIGN PATENT DOCUMENTS

| | | | |
|---|---|---|---|
| JP | S58-045466 | A | 3/1983 |
| JP | 62-12933 | Y2 | 4/1987 |
| JP | 6-73545 | | 10/1994 |
| JP | H7-217746 | A | 8/1995 |
| JP | 2006-292160 | A | 10/2006 |
| JP | 2014-206187 | A | 10/2014 |
| JP | 2015-072033 | A | 4/2015 |
| JP | 2019-210998 | A | 12/2019 |
| JP | 2020-085074 | A | 6/2020 |
| JP | 6961094 | B2 | 11/2021 |
| WO | WO 2016/047641 | A1 | 3/2016 |
| WO | WO 2020/045070 | A1 | 3/2020 |
| WO | WO 2020/202948 | A1 | 10/2020 |
| WO | WO 2022/059360 | A1 | 3/2022 |

OTHER PUBLICATIONS

Third Party Observation filed in PCT/JP2023/040882, dated Aug. 21, 2024 (w/ partial translation).

Extended European Search Report (EESR) issued in European Application No. 23891563.1, dated Oct. 13, 2026.

* cited by examiner

SEALING DEVICE

TECHNICAL FIELD

This disclosure relates to a sealing device.

BACKGROUND ART

A known sealing device includes an annular metal ring through which a rotary shaft is inserted, and a seal lip fixed to the annular metal ring (e.g., Patent Documents 1 to 3). The seal lip of the sealing device is in close contact with a peripheral surface of the rotary shaft and separates an oil-filled internal space from an external space and seals the internal internal space. This type of sealing device is commonly used in a variety of applications, such as vehicles, general machinery, and industrial machinery.

RELATED ART DOCUMENT

Patent Documents

Patent Document 1
Japanese Patent Application Laid-Open Publication No. 2019-210998
Patent Document 2
WO 2020/045070
Patent Document 3
Japanese Patent Application Laid-Open Publication No. 2020-85074

SUMMARY OF THE INVENTION

Problem to Be Solved by the Invention

With advancement of technology and year-upon-year increases in rotation speeds of rotary shafts, demand has risen for a sealing device suitable for use with a high-speed rotatable shaft. An object of this disclosure is to provide a sealing device suitable for use with a high-speed rotatable shaft.

Means for Solving the Problems

A sealing device according to an aspect of this disclosure includes an annular metal ring, and an annular seal lip provided on the metal ring. A rotary shaft rotatable clockwise and counterclockwise is inserted into the seal lip. The seal lip is configured to come into contact with the rotary shaft and to withstand sliding against the rotary shaft when the rotary shaft is rotated at a circumferential speed of 50 m per second.

Effect of the Invention

According to an aspect of this disclosure, a sealing device applicable to a high-speed rotatable shaft is provided.

MODES FOR CARRYING OUT THE INVENTION

Figure 1:
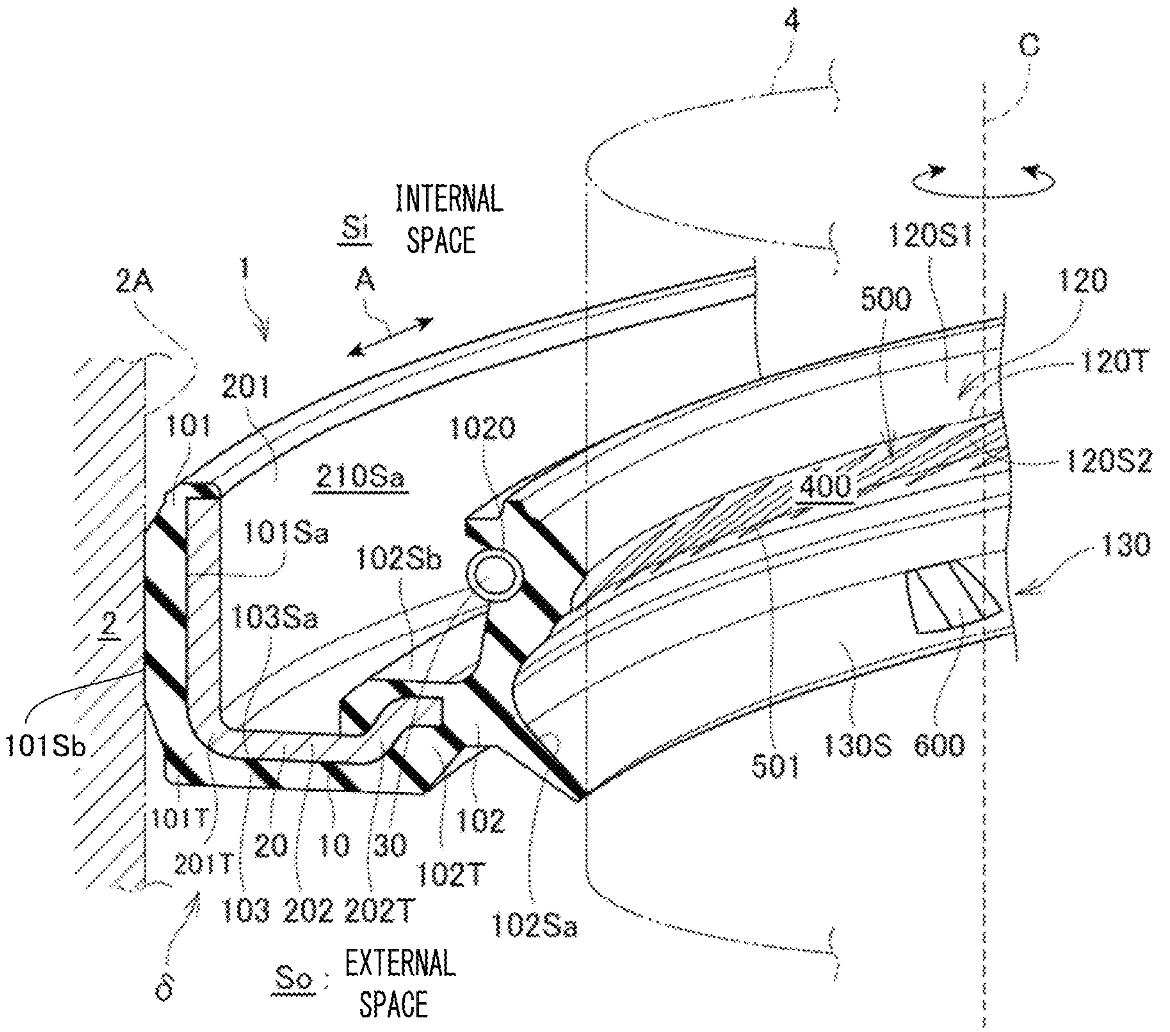
FIG. 1 is a diagram showing an example of a structure of a sealing device according to an embodiment of this disclosure.

Description will be now given of an embodiment of this disclosure with reference to the drawings. Dimensions and scales of elements in the drawings may differ from actual products. The embodiment described below is an example envisaged when implementing this disclosure. Thus, the scope of this disclosure is not limited to the following embodiment.

1. Embodiment

FIG. 1 is a diagram showing an example of a structure of a sealing device 1 according to an embodiment of this disclosure. The sealing device 1 is an annular member. FIG. 1 depicts in partial section the structure of sealing device 1 in a circumferential direction A.

The sealing device 1 is disposed between a housing 2 and a rotary shaft 4. The sealing device 1 seals a gap δ between the housing 2 and the rotary shaft 4. The housing 2 is an example of an outer member, and the rotary shaft 4 is an example of an inner member disposable within the outer member. The housing 2 and the rotary shaft 4 are each rotatable members and are rotatable relative to each other in both clockwise and counterclockwise directions. More specifically, the housing 2 has a cylindrical shaft opening 2A into which the cylindrical rotary shaft 4 is inserted through the shaft opening 2A for rotation in both clockwise and counterclockwise directions. Hereinafter, an axis along the center of the shaft opening 2A is referred to as a "central axis C." The circumferential direction A refers to a circumferential direction of a virtual circle with a certain diameter about the central axis C.

The sealing device 1 is an annular member that surrounds the rotary shaft 4 in the circumferential direction A The sealing device 1 is disposed in the gap δ between the shaft opening 2A and the rotary shaft 4, and divides the gap δ into an internal space Si and an external space So. The internal space Si is sealed by the sealing device 1

In this embodiment, the internal space Si is a space within the housing 2 and contains a liquid, while the eternal space So is outside of the housing 2. The liquid in the internal space Si is typically oil, which is an example of a lubricant. The oil may be in the form of a relatively high-viscosity grease that becomes semi-fluid at room temperature. Typically, the external space So is opened to the atmosphere. The sealing device 1 according to this embodiment is also referred to as an “oil seal” that seals the internal space Si in which liquid, such as oil, is contained.

As shown in FIG. 1, the sealing device 1 includes an elastic ring 10, a reinforcing ring 20, and a garter spring 30. Each of the elastic ring 10, the reinforcing ring 20, and the garter spring 30 are annular members.

The elastic ring 10 is provided on the reinforcing ring 20 and is a molded body comprised of an elastic material as a main material. The elastic ring 10 includes an annular seal lip 120. An inner side of the seal lip 120 is in contact with the rotary shaft 4, and seals the gap δ. Examples of the elastic material include chloroprene rubber (CR), silicone rubber (SR), acryl rubber (ACM), urethane rubber (U), polyurethane rubber (PUR), vinyl methyl silicone rubber (VMQ), ethylene propylene diene rubber (EPDM), and fluororubber (FKM). In this embodiment, among these elastic materials, fluororubber with a relatively high heat resistance is used as a main material of the elastic ring 10. Description will be given later of a configuration of the elastic ring 10.

The reinforcing ring 20 is a structure that reinforces the elastic ring 10. The reinforcing ring 20 is an example of a metal ring according to this disclosure. The reinforcing ring 20 is, for example, a highly rigid annular member comprised of a metal as a main material. Examples of the metal material include stainless-steel, SPCC (Steel Plate Cold Commercial), and SPHC (Steel Plate Hot Commercial).

The reinforcing ring 20 according to this embodiment is L-shaped in cross-section. Specifically, the reinforcing ring 20 includes a cylindrical portion 201 and a flange 202. The cylindrical portion 201 extends along the central axis C. An inner peripheral surface 201Sa of the cylindrical portion 201 faces an outer peripheral surface of the rotary shaft 4. The flange 202 extends toward the central axis C from an end 201T. The end 201T is a part of the cylindrical portion 201 and is positioned near the external space So. Thus, the cylindrical portion 201 and the flange 202 form a L-shape in cross-section. In the reinforcing ring 20, an outer peripheral surface of the cylindrical portion 201 is in close contact with the elastic ring 10, and a distal end 202T of the flange 202 is embedded in the elastic ring 10. As a result, the reinforcing ring 20 and the elastic ring 10 are joined to be integral with each other. Such a joined structure is obtained by insert molding with use of the reinforcing ring 20 as an insert part.

The garter spring 30 is a spring material that urges a seal lip 120 of the elastic ring 10 toward the central axis C. Specifically, the garter spring 30 is wound around the seal lip 120 at a position opposite to the rotary shaft 4 as viewed from the seal lip 120. The seal lip 120 elastically tightens and is urged toward the central axis C by the garter spring 30, thereby ensuring that an appropriate contact pressure is maintained between the seal lip 120 and the rotary shaft 4. The sealing device 1 need not include the garter spring 30.

Next, detailed description will be given of a configuration of the elastic ring 10. As shown in FIG. 1, the elastic ring 10 is substantially C-shaped in cross section. The reinforcing ring 20 is fixed to the inside the elastic ring 10. Specifically, the elastic ring 10 includes three portions: a first cylindrical portion 101, a second cylindrical portion 102, and a connecting portion 103. The first and second cylindrical portions 101 and 102 each extend along the central axis C. The first cylindrical portion 101 has a diameter greater than that of the second cylindrical portion 102 and is positioned outside the second cylindrical portion 102. When the sealing device 1 is disposed in the gap δ, the first cylindrical portion 101 has an outer peripheral surface 101Sb that is in contact with the shaft opening 2A in the housing 2, and the second cylindrical portion 102 has an inner peripheral surface 102Sa that is in contact with the rotary shaft 4.

The connecting portion 103 is used to connect an end 101T of the first cylindrical portion 101 with an end 102T of the second cylindrical portion 102. The connecting portion 103 according to this embodiment has an annular shape and a substantially constant thickness. The first cylindrical portion 101, the second cylindrical portion 102, and the connecting portion 103 are substantially C-shaped in cross section. The sealing device 1 is installed in the gap δ such that a substantially C-shaped inner part in cross section is open to the internal space Si.

The cylindrical portion 201 of the reinforcing ring 20 is fixed in close contact with an inner peripheral surface 101Sa of the first cylindrical portion 101. The flange 202 of the reinforcing ring 20 is fixed in close contact with an upper surface 103Sa of the connecting portion 103. The distal end 202T of the flange 202 is embedded in an outer peripheral surface 102Sb of the second cylindrical portion 102. Thus, when the sealing device 1 is installed between the housing 2 and the rotary shaft 4, the elastic ring 10 and the reinforcing ring 20 maintain a shape each of the first cylindrical portion 101 of the elastic ring 10 and the connecting portion 103.

The second cylindrical portion 102 is provided with two structures on the inner peripheral surface 102Sa: a seal lip 120 and a dust lip 130. The seal lip 120 and the dust lip 130 each protrude toward the central axis C and are each annular in cross section.

The seal lip 120 on the second cylindrical portion 102 is positioned adjacent to the internal space Si and is in contact with the rotary shaft 4 at that position. The seal lip 120 in contact with the rotary shaft 4 and divides the gap δ into the internal space Si and the external space So, to seal the internal space Si. Sealing by the seal lip 120 prevents liquid from flowing out of the internal space Si to the external space So.

The dust lip 130 on the second cylindrical portion 102 is disposed adjacent to the external space So and is in contact with the rotary shaft 4 at that position. Contact of the dust lip 130 with the rotary shaft 4 prevents foreign matter, such as dust or other similar matter, from intruding into the internal space Si from the external space So.

A groove 1020 is provided on the outer peripheral surface 102Sb of the second cylindrical portion 102. The vertical position of the groove 1020 corresponds to that of the seal lip 120 on the inner peripheral surface 102Sa. The garter spring 30 is fitted into the groove 1020, and the seal lip 120 is pressed by the garter spring 30 against the rotary shaft 4 with sufficient force to seal the gap δ.

The sealing device 1 with such a configuration may include a freely selected mechanical component, preferable examples of which include an automotive component. In this embodiment, the automotive component may include a rotary shaft via which output of a motor mounted to a vehicle is transmitted. The motor of the vehicle may be an internal combustion engine, an electric motor, or a hybrid of both. In the field of vehicles, with recent advancement in electrification, a variety of electric vehicles have become available. Year-upon-year, speeds of electric vehicles increase along with rotation speeds of output shafts of electric motors.

Figure 2:
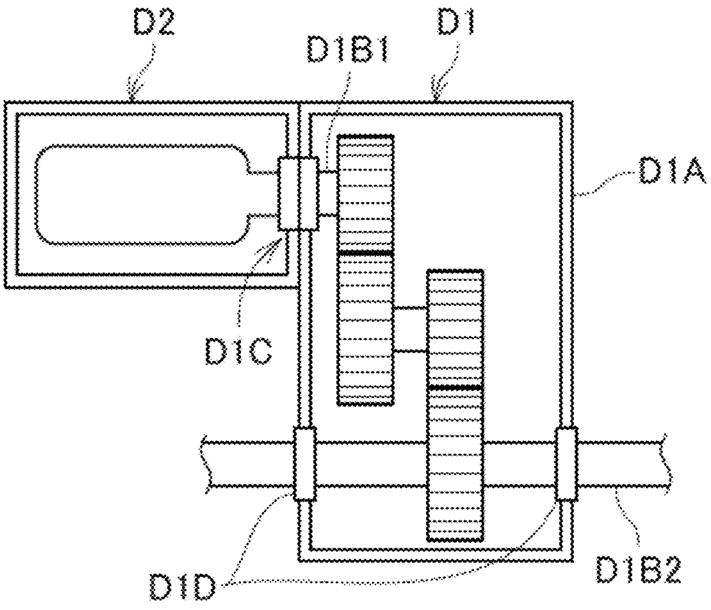
FIG. 2 is a schematic diagram showing a configuration of a decelerator together with an electric motor.

FIG. 2 is a schematic diagram showing a configuration of a decelerator D1, which is one type of an automotive component, together with an electric motor D2. As shown in FIG. 2, the decelerator D1 includes a housing D1A, an input part D1C, and an output part D1D. The input part D1C includes a first rotary shaft D1B1 that is rotated by the electric motor D2. The output part D1D includes a second rotary shaft D1B2 that outputs power outside of the housing D1A. The input part D1C and the output part D1D are each provided with an oil seal. With recent increases in speeds of electric vehicles, when an electric vehicle moves forward, the first rotary shaft D1B1 and the second rotary shaft D1B2 can each reach a maximum circumferential speed of 50 m per second in a clockwise direction. When the electric vehicle moves backward, the first rotary shaft D1B1 and the second rotary shaft D1B2 can each reach a maximum circumferential speed of 20 m per second in a counterclockwise direction.

Performance of conventional oil seals is not sufficient to meet demands of high-speed rotation of each of the first and second rotary shafts D1B1 and D1B2. As a result, oil leakage is liable to occur, whereby oil in the internal space Si leaks through the oil seal to the external space So.

Two or more sealing devices 1 according to this embodiment may be used as oil seals for the input part D1C and the output part D1D of the decelerator D1. The sealing device 1 according to this embodiment is configured to withstand sliding of the seal lip 120 on the first and second rotary shafts D1B1 and D1B2 rotating at high speed. As a result, oil leakage is prevented. In addition, the sealing device 1 according to this embodiment is configured to enhance fuel and power efficiency of vehicles. The sealing device 1 according to this embodiment may be used as an oil seal between the first rotary shaft D1B1 and the housing D1A.

Specifically, the sealing device 1 according to this embodiment is configured to suppress the following (i) and (ii) as compared to a conventional sealing device 1: (i) a rise in a lip temperature due to heat generated by sliding when the rotary shaft 4 rotates at high speed and slides, and (ii) a torque of the rotary shaft 4 when the rotary shaft 4 is in contact with the seal lip 120. Here, the term "lip temperature" refers to a surface temperature of the seal lip 120. Suppression of a rise in the lip temperature reduces occurrence of defects in the seal lip 120 and oil leakage. In addition, suppression of torque generated by the sealing device 1 reduces fuel and power consumption in vehicles.

Detailed description will be given below of a configuration of the sealing device 1.

As shown in FIG. 1, the seal lip 120 according to this embodiment includes a first slope 120S1 and a second slope 120S2 that meet at a position close to the rotary shaft 4. The first and second slopes 120S1 and 120S2 are substantially triangular in form in cross section. In this disclosure, the position at which the first and second slopes 120S1 and 120S2 meet is referred to as an "edge 120T." The elastic ring 10 has a diameter φ, which is defined by a diameter of a horizontal cross-sectional plane obtained by cutting the seal lip 120 perpendicular to the central axis C at the edge 120T. In this embodiment, the diameter φ of the elastic ring 10 is 95 mm.

The first slope 120S1 of the seal lip 120 is adjacent to the internal space Si. With the sealing device 1 installed, oil contained in the internal space Si is in contact with the first slope 120S1, and an oil film is formed on a surface of the first slope 120S1. Presence of the oil film results in a reduction in a coefficient of friction of the first slope 120S1. As a result, an increase in a sliding resistance is suppressed with an increase in speed of the rotary shaft 4, and thus heat generated by sliding is also suppressed.

The second slope 120S2 of the seal lip 120 faces the dust lip 130 and is adjacent to the external space So. With the sealing device 1 installed, the second slope 120S2 is exposed to the external space So, and thus, compared to the first slope 120S1, there is a tendency for its surface to become dry. If no countermeasure is taken, heat generated by sliding against the second slope 120S2 increases as the velocity of the rotary shaft 4 increases. Thus, according to this embodiment, substantially the entirety of the second slope 120S2 is covered by a coating layer 400 that reduces a coefficient of friction between the rotary shaft 4 and the second slope 120S2. Thus, the coating layer 400 is a layer that has a lower coefficient of friction with the rotary shaft 4 than that of the main material of the second slope 120S2. The coating layer 400 suppresses heat generated by sliding against the second slope 120S2. Further, since the second slope 120S2 has a small coefficient of friction due to provision of the coating layer 400, a torque of the rotary shaft 4 also decreases.

Thus, the seal lip 120 according to this embodiment includes the first slope 120S1 and the second slope 120S2. The first slope 120S1 is in contact with the oil in the internal space Si, and the coefficient of friction of the first slope 120S1 decreases due to presence of the oil film. The coefficient of friction of the second slope 120S2 decreases due to provision of the coating layer 400.

As a result, since the heat generated by sliding against each of the first and second slopes 120S1 and 120S2 is suppressed, a rise in the lip temperature is effectively suppressed. Moreover, a torque of the rotary shaft 4 also decreases. As described above, the main material of the elastic ring 10 including the seal lip 120 is a highly heat resistant fluororubber, use of which enhances durability of the seal lip 120 under temperature.

Next, detailed description will be given of the coating layer 400 according to this embodiment.

Figure 3:
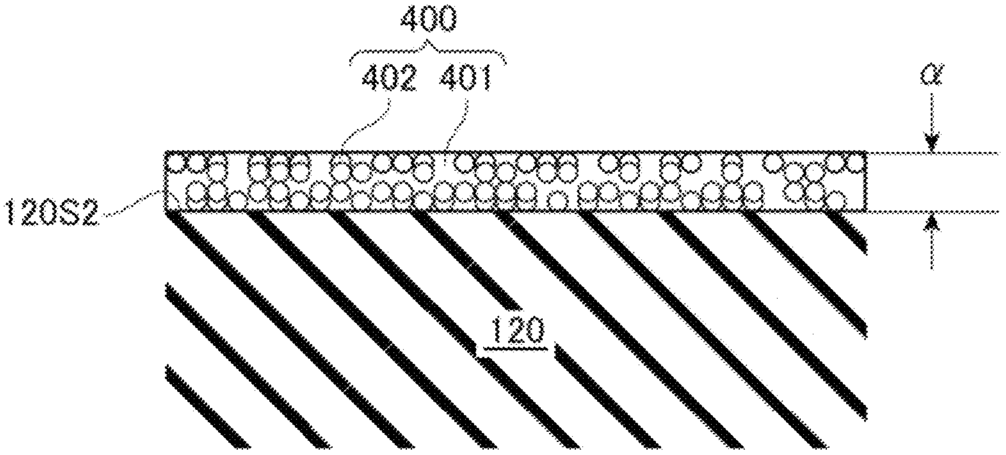
FIG. 3 is a schematic diagram showing a cross-sectional structure of a seal lip.

FIG. 3 is a schematic diagram showing a cross-sectional structure of the seal lip 120. The coating layer 400 includes a binder layer 401 with a thickness α, and particles 402 dispersed in the binder layer 401. The coating layer 400 has a coefficient of friction smaller than at least the unprocessed second slope 120S2. The main material of the binder layer 401 is, for example, a resin, and in this embodiment may comprise a mix of poly butadiene, polyethylene, and butyl acetate. The main material of each particle 402 is, for example, a resin, and it may be a PTFE (Polytetrafluoroethylene), which is a type of fluororesin.

An example will be given below of a method for manufacturing the coating layer 400. At a first step, a mixed material is prepared. The mixed material is obtained by mixing particles 402 with a resin, which serves as the main material of the binder layer 401, at a predetermined dispersion density. Then, at a second step, the second slope 120S2 is coated with the mixed material. Specifically, the mixed material is applied at the thickness α over substantially the entirety of the second slope 120S2. Thereafter, at a third step, the mixed material is cured by drying. By this series of steps, the second slope 120S2 is provided with the coating layer 400.

The coating layer 400 in the sealing device 1 according to this embodiment has a thickness α of 10 μm with an error in the order of ±a few micrometers. If the thickness α is greater than 10 μm, a difference in a degree of curing between the surface and the deep layer of the coating layer 400 increases during drying at the third step. As a result, there is a tendency for unevenness such as creasing to occur on the surface of the coating layer 400. Such surface unevenness reduces smoothness, which leads to an increase in the coefficient of friction and impedes reduction of heat generated by sliding and torque. In addition, deformations in the coating layer 400 tends to result in deformations in the seal lip 120 during installation, leading to defects such as cracks occurring in the coating layer 400.

In contrast, if the thickness α is less than 10 μm, the second slope 120S2 is easily exposed at an early stage due to wear by the rotary shaft 4. Further, during drying at the third step, cracks tend to occur on the surface of the coating layer 400, which greatly degrade durability. Thus, the thickness α of the coating layer 400 is set at 10 μm, which provides a sufficiently low coefficient of friction and good durability with the rotary shaft 4 rotating at high speed.

Figure 4:
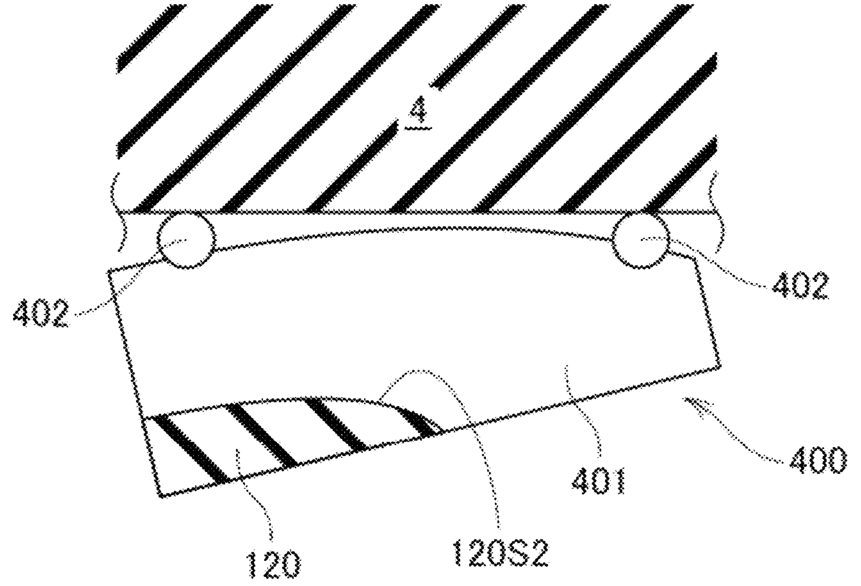
FIG. 4 is a schematic diagram showing a change in a second slope of the seal lip.

In the sealing device 1 according to this embodiment, the dispersion density of the particles 402 is a predetermined value that provides a target coefficient of friction. If the dispersion density is less than the predetermined value, a proportion of non-particles on the surface of the coating layer 400 increases, that is, a proportion of the binder layer 401 increases, and the resulting coefficient of friction is too high to provide an adequate reduction in sliding resistance. When the seal lip 120 curves due to contact with the rotary shaft 4, the coefficient of friction increases. This is because distances between the particles 402 increase, as illustrated in FIG. 4, for example. Consequently, reduction of heat generated by sliding and torque is impaired.

The particles 402 are uniformly dispersed in the binder layer 401. However, the particles 402 may be non-uniformly distributed as long as the coefficient of friction is not affected.

As shown in FIG. 1, the seal lip 120 according to this embodiment is provided with a return portion 500 on the second slope 120S2. The return portion 500 is used to return to the internal space Si, oil leaking from the internal space Si to the external space So. By providing the return portion 500 with the seal lip 120, oil leakage can be more reliably prevented.

Specifically, the return portion 500 includes protrusions 501. The protrusions 501 provides so-called “pumping action,” by which oil leaking from the internal space Si to the external space So is returned to the internal space Si in accordance with rotation of the rotary shaft 4 relative to the housing 2. Each protrusion 501 may have a freely chosen shape. For example, each protrusion 501 may be a spiral rib as disclosed in Japanese Patent No. 6961094, or may be a triangular protrusion as disclosed in Japanese Patent Application Laid-Open Publication Patent No. 2020-85074. The protrusions 501 are examples of “first protrusions.”

In this embodiment, the protrusions 501 of the return portion 500 are covered by the coating layer 400. The coating layer 400 reduces a coefficient of friction between the protrusions 501 and the rotary shaft 4. As a result, even when the rotary shaft 4 rotates at high speed, the protrusions 501 are pulled by the rotation of the rotary shaft 4, and deformation of the protrusions 501 is suppressed in a direction of rotation of the rotary shaft 4, and thus “oil return” by the pumping action is maintained.

According to the sealing device 1 of this embodiment, as shown in FIG. 1, the dust lip 130 that is in contact with the entire circumference of the rotary shaft 4 is disposed at a position close to the external space So, as viewed from the seal lip 120. In other words, as viewed from the seal lip 120, a space closer to the external space So is separated from the external space So by the dust lip 130. If with such a configuration there is high adhesion between the dust lips 130 and the rotary shaft 4, the pumping action of the seal lip 120 causes a space to open between the seal lip 120 and the dust lip 130 whereby a negative pressure is generated in the external space So, which leads to a decrease in the pumping action.

Therefore, the dust lip 130 according to this embodiment is provided with protrusions 600 on a contact surface 130S that are in contact with the rotary shaft 4. For example, the protrusions 600 are provided at intervals in the circumferential direction A. Provision of the protrusions 600 causes gaps, each of which is defined by adjacent protrusions 600 in the circumferential direction, the rotary shaft 4, and the contact surface 130S. Since a space between the seal lip 120 and the dust lip 130 is connected to the external space So through the gaps created by the protrusions 600, the space is prevented from being subject to a negative pressure, and a decrease in the pumping action is suppressed. The protrusions 600 are examples of “second protrusions.”

Next, description will be given of results of an evaluation test for the sealing device 1 according to this embodiment.

Figure 5:
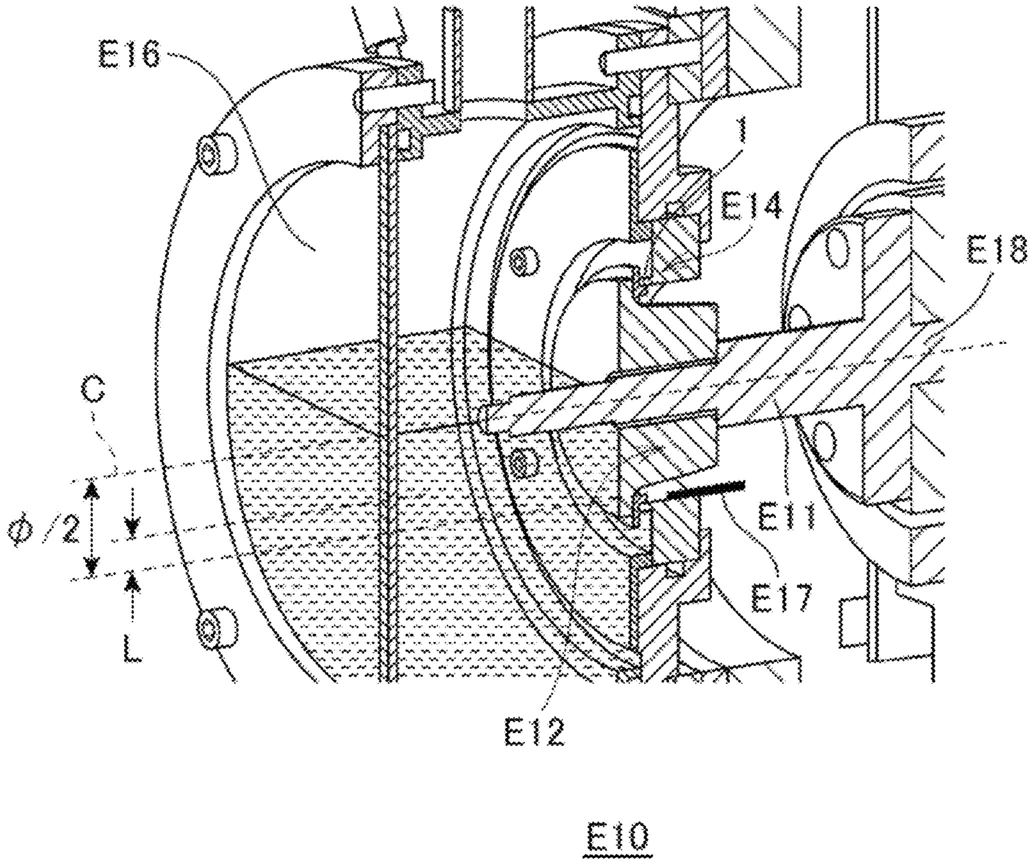
FIG. 5 is a diagram showing a schematic configuration of a test device used in an evaluation test.

FIG. 5 is a diagram showing a schematic configuration of a test device E10 used in the evaluation test. The test device E10 includes a rotary shaft E11 rotatable about its axis. A metallic disk-shaped flange E12 is attached to a distal end of the rotary shaft E11. The rotary shaft E11 and the flange E12 are rotatable together. The test device E10 further includes an annular metallic member E14 that corresponds to the housing 2. The sealing device 1 is inserted into a gap between the flange E12 and the annular member E14, and thereby an interior of the test device E10 is sealed.

The test device E10 is provided with a sealed head E16 by which a sealed space is defined. The sealed head E16 is outer to the annular member E14 and the flange E12. The sealed space corresponds to the internal space Si, and oil is contained in the sealed space. The rotary shaft E11 of the test device E10 extends substantially horizontally. When oil is contained up to a central axis C of the rotary shaft E11, the entire circumference of the lower half of the seal lip 120, which is located vertically below the central axis C, is immersed in the oil. Hereinafter, an oil volume is defined by a distance L in a radial direction of the seal lip 120 from a position of the seal lip 120 vertically below the central axis C up to the oil surface. level. The distance L is referred to as an oil volume. The oil used is a low-viscosity ATF (Automatic Transmission Fluid).

The test device E10 is provided with an oil sensor E17. The oil sensor E17 is attached to the inner peripheral surface of the annular member E14 at a position near the sealing device 1. When the enclosed oil leaks through the sealing device 1 from the enclosed space to an adjacent space at which the oil sensor E17 is provided, the leaked oil is detected by the oil sensor E17. A torque detector E18 is provided on the rotary shaft E11 and detects a torque of the rotary shaft E11 at a certain cycle. The test device E10 is also provided with a thermocouple (not shown) on the seal lip 120 of the sealing device 1. A lip temperature is detected by the thermocouple.

Figure 6:
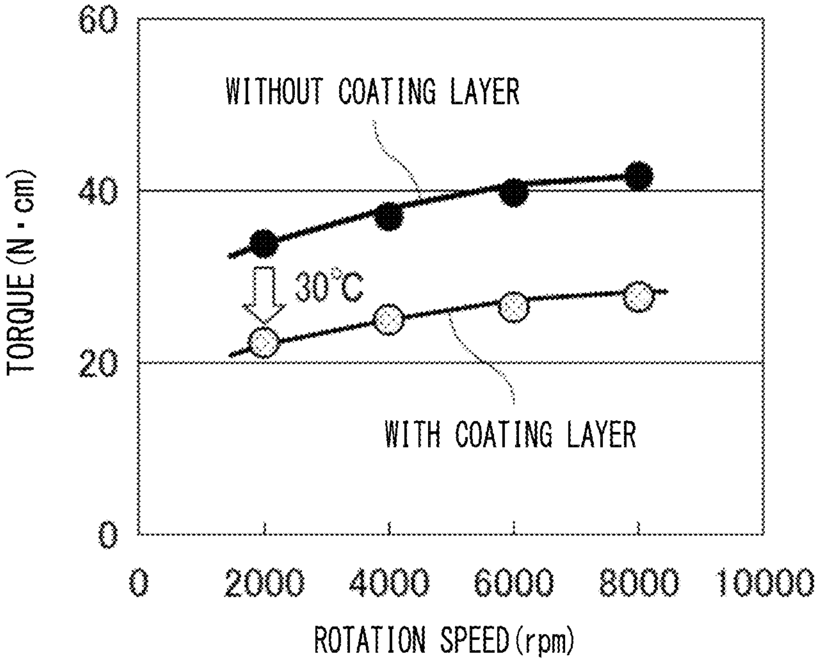
FIG. 6 is a graph showing a relationship between a rotation speed of a rotary shaft and a torque thereof.

FIG. 6 is a graph showing a relationship between a rotation speed of the rotary shaft E11 (unit: rpm) and a torque thereof (unit: N*cm). In the evaluation test, a temperature of oil used was 80° C., and the oil volume L was 15 mm. As shown in FIG. 6, the rotation speed ranges from 2000 rpm to 8000 rpm.

As shown in FIG. 6, the torque monotonically increases as the rotation speed increases from 2000 rpm to 8000 rpm. The results of the evaluation test show effects of reduction in the torque. Specifically, provision of the coating layer 400 on the seal lip 120 reduces the torque by 30% or more, as compared to when the coating layer 400 is not provided.

Figure 7:
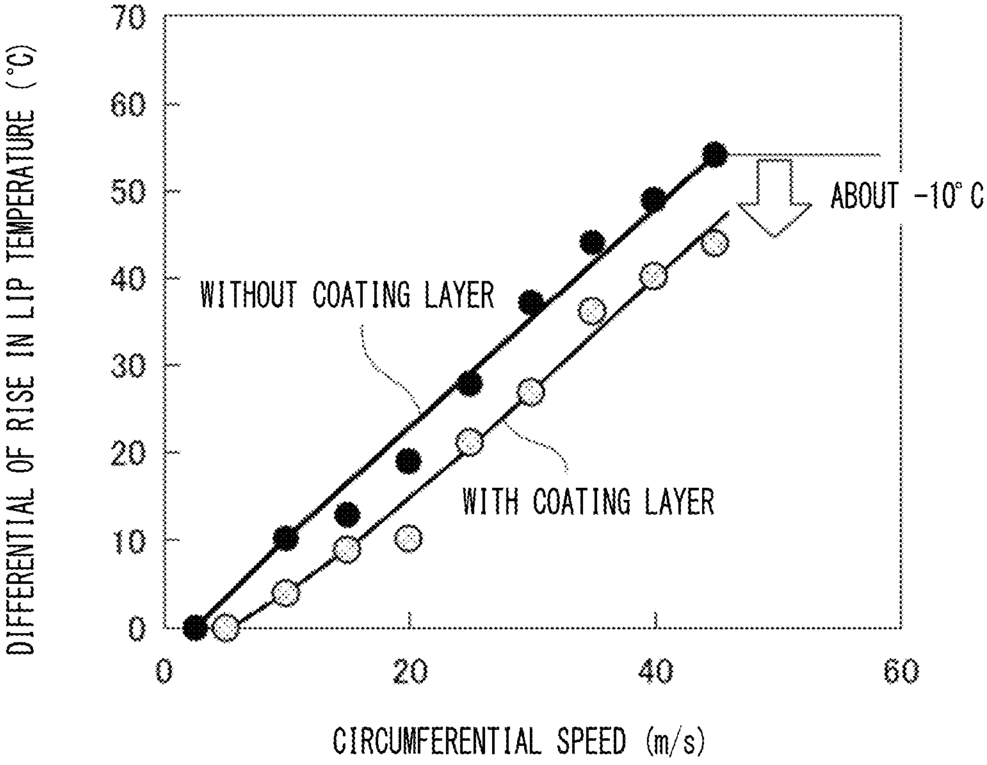
FIG. 7 is a graph showing a relationship between a circumferential speed of the rotary shaft and a differential of rise in a lip temperature.

FIG. 7 is a graph showing a relationship between a circumferential speed of the rotary shaft E11 (unit: m/s) and a differential of rise in the lip temperature (unit: ° C.). In the evaluation test, a temperature of oil used was 80° C., and the oil volume L was 15 mm.

As shown in FIG. 7, as the circumferential speed increases from 0 to 50 m/s, the differential of rise in the lip temperature increases in proportion to the circumferential speed. The results of the evaluation test show that a differential of rise in the lip temperature decreases. Specifically, provision of the coating layer 400 on the seal lip 120 reduces the differential of rise in the lip temperature by about 10% in the range of at least 0 to 50 m/s of the circumferential speed, as compared to when the coating layer 400 in not provided. In other words, heat generated by sliding against the seal lip 120 is reduced.

Figure 8:
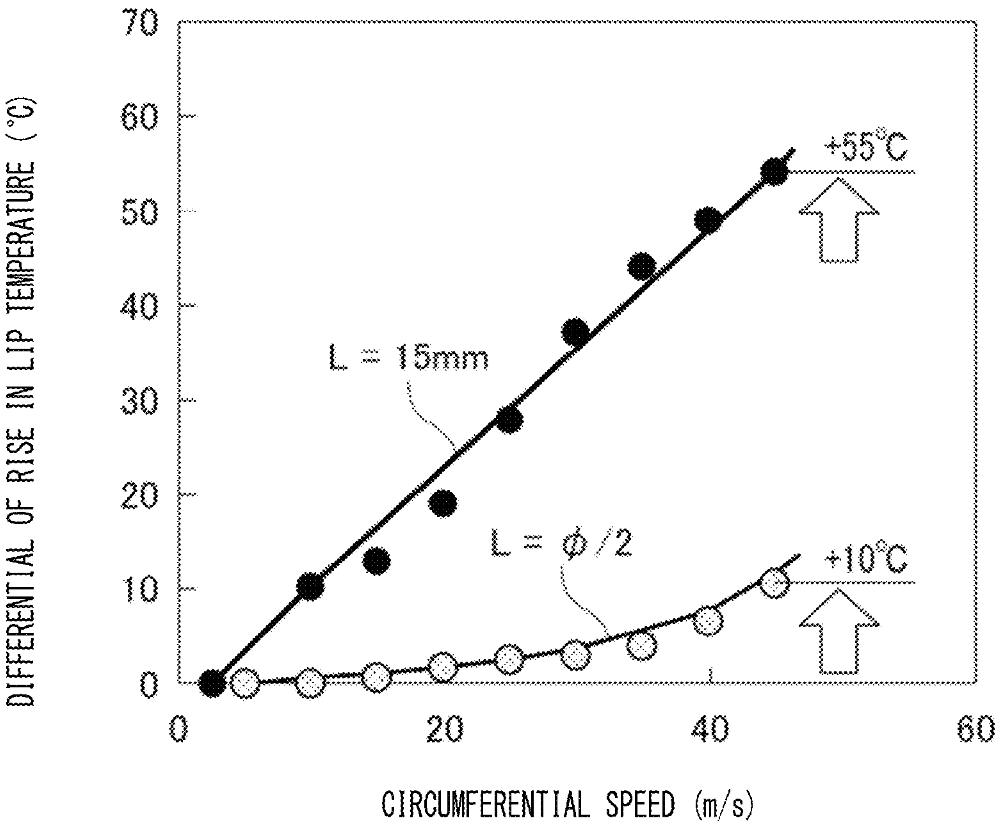
FIG. 8 is a graph showing results given by evaluating at different oil volumes, a relationship between a circumferential speed of the rotary shaft and a differential of rise in the lip temperature.

Thus, the results of the evaluation test shown in FIGS. 7 and 8 demonstrate that provision of the coating layer 400 on the sealing device 1 according to this embodiment provides effects of reducing torque and of reducing heat generated by sliding.

The oil in the internal space Si contributes to suppressing a rise in the lip temperature. The smaller the oil volume L, the greater the lip temperature, and thus the seal lip 120 is prone to becoming defective. This phenomenon will be described in detail below.

FIG. 8 is a graph showing results obtained by evaluating at different oil volumes L, a relationship between a circumferential speed of the rotary shaft E11 (unit: m/s) and a differential of rise in the lip temperature (unit: ° C.). In the evaluation test, a temperature of oil used was 80° C.

As shown in FIG. 8, for the oil volume L of φ/2 (where (φ=95 mm), that is, when the oil level is at the central axis C of the rotary shaft E11, the differential of rise in the lip temperature gradually increases as the circumferential speed increases from 0 to 40 m/s. At the circumferential speed of 50 m/s, the differential of rise in the lip temperature is about 10° C.

For the oil volume L of 15 mm, as the circumferential speed increases from 0 to 50 m/s, the differential of rise in the lip temperature increases in proportion to the circumferential speed. At the circumferential speed of 50 m/s, the differential of rise in the lip temperature reaches about 55° C.

Thus, the results of the evaluation test show that for the oil volume L of less than φ/2, the lip temperature greatly increases in accordance with an increase in circumferential speed. The lesser the oil volume L is, the more pronounced this tendency becomes.

Figure 9:
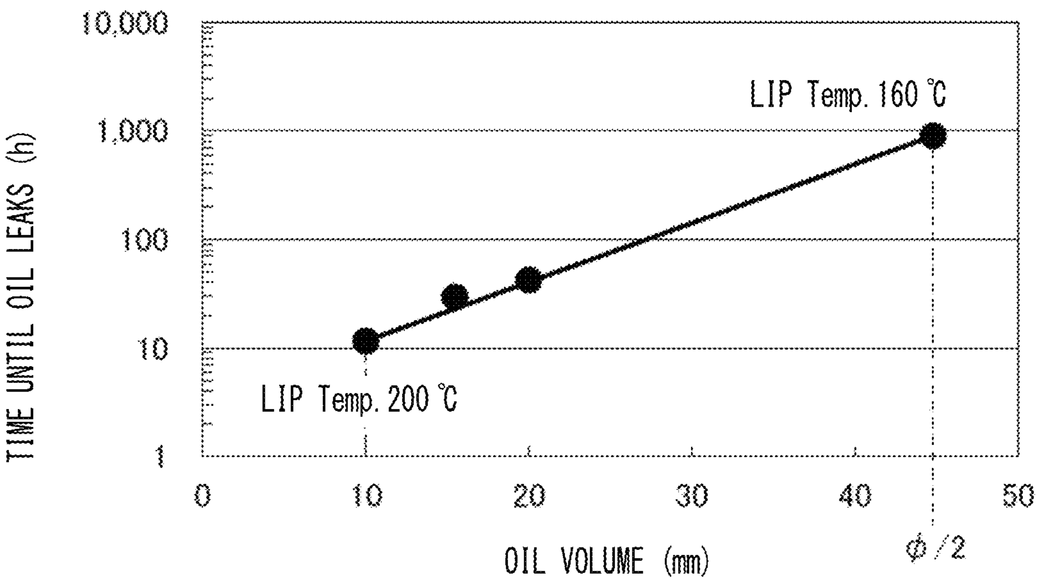
FIG. 9 is a graph showing a relationship between an oil volume and a time until oil leakage.

FIG. 9 is a graph showing a relationship between an oil volume L (unit: mm) and a time until oil leakage (unit: hour). In the evaluation test, samples without the coating layer 400 on the sealing device 1 were used, and the rotation speed of the rotary shaft E11 varied from 0 to 15000 rpm at the oil temperature of 150° C.

As shown in FIG. 9, at the oil volume L of φ/2 (where φ=95 mm), that is, when as a reference the oil level is at the central axis C of the rotary shaft E11, the time until oil leakage decreases exponentially as the oil volume L decreases. Specifically, at the oil volume L of φ/2, the lip temperature is 160° C., and the time until oil leakage is about 1000 hours. In contrast, at the oil volume L of 10 mm, the lip temperature reaches 200° C., and the time until oil leakage is shortened to about 10 hours.

After the test, the inventors observed a sample in which oil leaked at a lip temperature of 200° C. The observation revealed occurrence of defects such as cracks and blisters, on the surface of the seal lip 120. The findings show that such defects are factors that cause oil leakage at an early stage.

The test results in FIGS. 8 and 9 show the following. Even for the sealing device 1 without the coating layer 400, when the circumferential speed reaches 50 m/s for the oil volume L of φ/2, the differential of rise in the lip temperature is suppressed to about 10° C. When the temperature of oil is 150° C., the lip temperature is suppressed to 160° C., and thereby a sufficiently long time elapses before oil leaks. As a result, a sufficient life span is maintained even in the sealing device 1 not provided with the coating layer 400.

For the sealing device 1 without the coating layer 400, when the oil volume L is less than φ/2, the lip temperature greatly increases in accordance with an increase in circumferential speed. For the oil volume L of 15 mm, at the circumferential speed of 50 m/s, the differential of rise in the lip temperature reaches about 55° C. When the temperature of the oil is 150° C., the lip temperature reaches 200° C., and the time until oil leakage is exponentially shortened to about 10 hours.

In the sealing device 1 according to this embodiment, even for the oil volume L of less than φ/2, the differential of rise in the lip temperature is suppressed. This is because provision of the coating layer 400 suppresses the differential of rise in the lip temperature as shown in FIG. 7. Consequently, a shortened time until oil leakage is prevented, and thus a shortened life span is prevented.

With a sufficient oil volume L of almost φ/2, the sealing device 1 according to this embodiment enables the life span to be further extended due to a reduction in the lip temperature.

The foregoing sealing device 1 according to this embodiment includes the annular reinforcing ring 20 and the annular seal lip 120 provided on the reinforcing ring 20. The rotary shaft 4 rotatable clockwise and counterclockwise is inserted into the seal lip 120. The seal lip 120 is configured to come into contact with the rotary shaft 4 and to withstand sliding against the rotary shaft 4 rotatable at a circumferential speed of 50 m per second.

According to this configuration, the sealing device 1 can withstand use when the circumferential speed of the rotary shaft 4 increases up to 50 m per seconds, and thus is suitable for application with the high-speed rotary shaft 4.

In this embodiment, the seal lip 120 is provided with the coating layer 400 that reduces the coefficient of friction between the seal lip 120 and the rotary shaft 4.

According to such a configuration, even when the rotary shaft 4 rotates at high speed and slides, heat generated by sliding against the seal lip 120 is suppressed. Consequently, a rise in the lip temperature is suppressed along with deterioration of the seal lip 120 due to the rise in the lip temperature. Fuel and power consumption of a mechanism for driving the rotary shaft 4 are also reduced due to a reduction in a torque of the rotary shaft 4.

In this embodiment, the seal lip 120 includes the first slope 120S1 and the second slope 120S2 that meet to form an edge. The first and second slopes 120S1 and 120S2 divide the gap δ between the rotary shaft 4 and the housing 2 (an example of the "outer member") into the internal space Si in which oil is present and the external space So. The first slope 120S1 is adjacent to the internal space Si. The second slope 120S2 is adjacent to the external space So and is covered by the coating layer 400.

According to this configuration, the first slope 120S1 of the seal lip 120 is in contact with the oil in the internal space Si, and thus the coefficient of friction of the first slope 120S1 decreases due to presence of the oil film. The coefficient of friction of the second slope 120S2 decreases due to presence of the coating layer 400. As a result, since the heat generated by sliding against each of the first and second slopes 120S1 and 120S2 is suppressed, a rise in the lip temperature is effectively suppressed.

In this embodiment, the coating layer 400 is a layer in which the fluororesin particles 402 are dispersed in the binder layer 401.

According to this configuration, the coefficient of friction decreases sufficiently due to the fluororesin particles 402.

In this embodiment, the main material of the seal lip 120 is fluororubber. According to this configuration, the durability of the seal lip 120 for the lip temperature is enhanced.

In this embodiment, the second slope 120S2 includes a return portion 500 for returning to the internal space Si, the oil flowing from the internal space Si to the external space So, and the return portion 500 includes the protrusions 501. The protrusions 501 are covered by the coating layer 400.

According to this configuration, even when the rotary shaft 4 rotates at high speed, the protrusions 501 of the return portion 500 are pulled by the rotation of the rotary shaft 4, which suppresses deformation of the protrusions 501 in a direction of rotation of the rotary shaft 4. Functionality of the oil return is thus maintained.

In this embodiment, the sealing device 1 further includes the dust lip 130 that is positioned close to the external space So as viewed from the second slope 120S2 and comes into contact with the rotary shaft 4. The dust lip 130 is provided with a protrusion 600 that secures a gap between the dust lip 130 and the rotary shaft 4.

According to this configuration, since a space between the seal lip 120 and the dust lip 130 is connected to the external space So through the gaps created by the protrusions 600, the space is prevented from being subjected to a negative pressure, and there is no decrease in the pumping action.

2. Modification

Specific modes of modification applicable the foregoing embodiment will be given below. Two or more aspects freely selected from the following examples may be combined, as appropriate, as long as such combination does not give rise to any conflict.

(1) In the foregoing described configuration of the sealing device 1, the seal lip 120 is provided with the coating layer 400 on the second slope 120S2. However, the seal lip 120 may be provided with the coating layer 400, in addition to the second slope 120S2, on at least one of the first slope 120S1 and the contact surface 130S of the dust lip 130.

Provision of the coating layer 400 on the first slope 120S1 further reduces the coefficient of friction of the first slope 120S1, and also further reduces heat generated by sliding. Provision of the coating layer 400 on the contact surface 130S of the dust lip 130 enhances lubricity of the protrusions 600, and gaps are created more easily.

Figure 10:
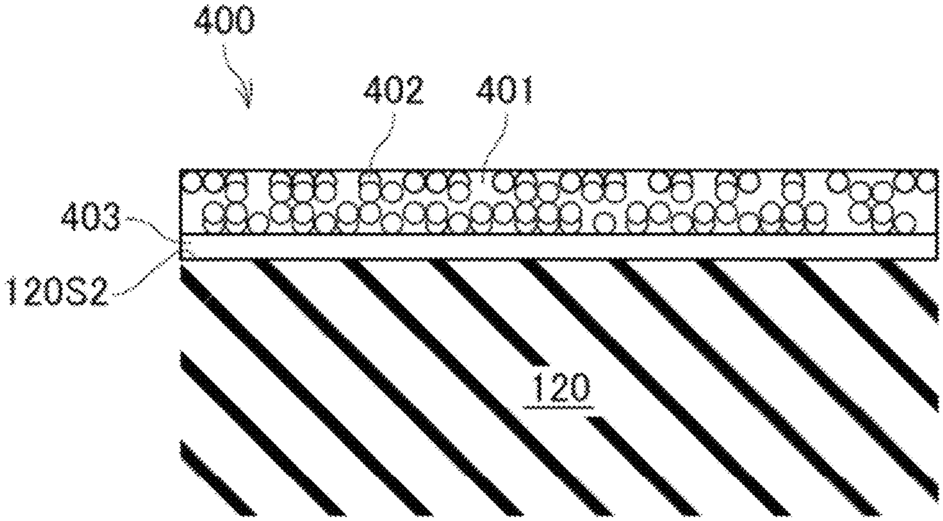
FIG. 10 is a schematic diagram showing a structure of a coating layer according to a modification of this disclosure.

(2) As shown in FIG. 10, the coating layer 400 of the sealing device 1 may include an adhesive layer 403 that enhances adhesion of the seal lip 120 to the second slope 120S2. For example, the adhesive layer 403 may comprise a resin as the main material of the binder layer 401. Since the adhesive layer 403 does not include PTFE particles 402, a contact area between the resin, serving as the main material, of the binder layer 401 and the second slope 120S2 increases, and adhesiveness is enhanced.

(3) In the foregoing embodiment, an example is described of the seal lip 120, in which the seal lip 120 can withstand sliding against the rotary shaft 4 rotatable at a circumferential speed of 50 m per seconds. However, the circumferential speed of the rotary shaft 4 that the seal lip 120 can withstand is not limited to thereto. For example, the seal lip 120 may be configured to withstand sliding against the rotary shaft 4 rotatable at a circumferential speed ranging from 30 m per seconds to 80 m per seconds. Alternatively, the seal lip 120 may be in contact with the rotary shaft 4 and may be configured to withstand sliding against the rotary shaft 4 rotatable at a circumferential speed of 80 m per seconds.

(4) In the foregoing embodiment, an example is described above of the sealing device 1 used as an oil seal. However, application of the sealing device 1 is freely selectable. Examples of the application of the sealing device 1 include an oil seal for an engine, an oil seal for a differential, an oil seal for a transmission, an oil seal for a motor, and an oil seal for a hub bearing. The sealing device 1 can also be used for applications other than oil seals. The sealing device 1 can also be used for sealing a variety of fluids, such as grease or water.

DESCRIPTION OF REFERENCE SIGNS

1 . . . sealing device, 2 . . . housing (outer member), 4 . . . rotary shaft, 10 . . . elastic ring, 20 . . . reinforcing ring (metal ring), 30 . . . garter spring, 120 . . . seal lip, 120S1 . . . first slope, 120S2 . . . second slope, 120T . . . edge, 130 . . . dust lip, 130S . . . contact surface, 400 . . . coating layer, 401 . . . binder layer, 402 . . . particles, 403 . . . adhesive layer, 500 . . . return portion, 501 . . . protrusions, 600 . . . protrusions, Si . . . internal, So . . . external space, and δ . . . gap.

The invention claimed is:

1. A sealing device comprising:

an annular metal ring; and an annular seal lip provided on the metal ring, wherein:

a rotary shaft rotatable clockwise and counterclockwise is inserted into the seal lip, and the seal lip is configured to come into contact with the rotary shaft and to withstand sliding against the rotary shaft when the rotary shaft is rotated at a circumferential speed of 50 m per second, wherein the seal lip is provided with a coating layer that reduces a coefficient of friction between the seal lip and the rotary shaft, wherein the coating layer is a layer in which fluororesin particles are dispersed in a binder, and wherein the binder comprises a mix of polybutadiene, polyethylene, and butyl acetate.

2. The sealing device according to claim 1, wherein:

the seal lip includes a first slope and a second slope that meet to form an edge, the first slope and the second slope divide a gap between the rotary shaft and the outer member into an internal space in which oil is present and an external space, the first slope is adjacent to the internal space, and the second slope is adjacent to the external space and is covered by the coating layer.

3. The sealing device according to claim 2, wherein a main material of the seal lip is a fluororubber.

4. The sealing device according to claim 2, wherein:

the second slope comprises a return portion for returning to the internal space, oil that flows from the internal space toward the external space, the return portion includes a plurality of first protrusions, and the plurality of first protrusions are covered by the coating layer.

5. The sealing device according to claim 4, further comprising a dust lip that is positioned close to the external space as viewed from the second slope and comes into contact with the rotary shaft, wherein the dust lip is provided with a second protrusion that secures a gap between the dust lip and the rotary shaft.

6. A sealing device comprising:

an annular metal ring; and an annular seal lip provided on the metal ring, wherein:

a rotary shaft rotatable clockwise and counterclockwise is inserted into the seal lip, and the seal lip is configured to come into contact with the rotary shaft and to withstand sliding against the rotary shaft when the rotary shaft is rotated at a circumferential speed of 80 m per second, wherein the seal lip is provided with a coating layer that reduces a coefficient of friction between the seal lip and the rotary shaft, wherein the coating layer is a layer in which fluororesin particles are dispersed in a binder, and wherein the binder comprises a mix of polybutadiene, polyethylene, and butyl acetate.

7. The sealing device according to claim 1, wherein a main material of the seal lip is a fluororubber.

* * * * *